US006240496B1

(12) United States Patent
Nylund

(10) Patent No.: US 6,240,496 B1
(45) Date of Patent: May 29, 2001

(54) ARCHITECTURE AND CONFIGURING METHOD FOR A COMPUTER EXPANSION BOARD

(75) Inventor: Helge Nylund, Fort Collins, CO (US)

(73) Assignee: Hyundai Electronics America, San Jose, CA (US)

(*) Notice: Subject to any disclaimer, the term of this patent is extended or adjusted under 35 U.S.C. 154(b) by 1388 days.

(21) Appl. No.: 08/570,256

(22) Filed: Dec. 11, 1995

Related U.S. Application Data

(63) Continuation of application No. 08/152,264, filed on Nov. 12, 1993, now abandoned, which is a continuation of application No. 07/440,826, filed on Nov. 24, 1989, now abandoned.

(51) Int. Cl.[7] ...................................................... G06F 12/02
(52) U.S. Cl. .............................................................. 711/170
(58) Field of Search ........................ 395/497.01, 497.02, 395/497.03; 711/170, 171, 172

(56) References Cited

U.S. PATENT DOCUMENTS

| 4,439,827 | 3/1984 | Wilkes . | |
|---|---|---|---|
| 4,571,671 | 2/1986 | Burns et al. . | |
| 4,703,198 | 10/1987 | Porter et al. . | |
| 4,712,176 | 12/1987 | Fredericks et al. . | |
| 4,720,784 | 1/1988 | Radhakrishnan et al. . | |
| 4,727,475 | * | 2/1988 | Kiremidjian .......................... 364/200 |
| 4,761,647 | 8/1988 | Hallenbeck et al. . | |
| 4,774,422 | 9/1988 | Donaldson et al. . | |
| 4,908,789 | * | 3/1990 | Blokkum et al. ..................... 364/900 |
| 4,964,038 | * | 10/1990 | Louis et al. .......................... 364/200 |
| 4,979,144 | * | 12/1990 | Mizuta ................................. 395/425 |
| 4,980,850 | * | 12/1990 | Morgan ................................ 364/900 |
| 5,027,313 | * | 6/1991 | Culley ................................... 364/900 |
| 5,038,320 | * | 8/1991 | Heath et al. .......................... 395/275 |
| 5,111,423 | * | 5/1992 | Kopec, Jr. et al. .................. 395/500 |
| 5,175,836 | * | 12/1992 | Morgan ................................ 395/425 |

* cited by examiner

Primary Examiner—Kevin L. Ellis
(74) Attorney, Agent, or Firm—Townsend And Townsend and Crew LLP

(57) ABSTRACT

An expansion board architecture and method for configuring the board. The board comprises a controller chip, a parallel bus, a memory for storing a plurality of configuration data bits, and a control line. The controller chip controls the operation of the board and has an internal register for storing a plurality of data bits. The parallel bus transfers data bits between the controller chip and other components on the board and is connected to the memory. The control line is connected between the controller and the memory for enabling the output of the memory to transfer the configuration bits to the register over the bus.

17 Claims, 2 Drawing Sheets

ARCHITECTURE AND CONFIGURING METHOD FOR A COMPUTER EXPANSION BOARD

This is a continuation of Ser. No. 08/152,264 filed Nov. 12, 1993 abn which is a continuation of copending application Ser. No. 07/440,826 filed on Nov. 24, 1989.

The present invention relates to an architecture for computer expansion boards. More particularly, it relates to an architecture which reduces the number of pins required to transfer configuration bits within such board.

BACKGROUND OF THE INVENTION

Many computer systems, such as the personal computer (PC) may be purchased with differing levels of functionality and/or storage capacity. Increased functionality and/or storage capacity may be obtained through upgrading a basic unit by connecting add-on boards to "expansion slots" provided on the PC. A typical expansion board is available to increase the memory capacity of the PC. Other expansion boards provide additional or supplemental processing power and/or provide interface capabilities for a variety of input/output (I/O) functions. Many such expansion boards include a microprocessor or controller to perform a designated function.

When an expansion board is added to a PC, the board may need to be provided with certain information that defines its relationship to the host or to other parts of the system. For example, a memory board that is to be addressable by the host must be provided with its starting and ending address so that it can function appropriately with respect to the other memory in the system. Other expansion boards may also have addressable memory space which requires a starting and ending address. In addition, there may be other information required by such other boards.

For example, an expansion board for connecting the host to a local area network (LAN) may need information specifying its network node number, defining its interrupt level, etc.

The bits of data which define the information provided to the board are referred to as configuration bits and the act of providing the data bits to the board is referred to as configuring the board. Some boards are configured by manually operated switches which are connected to the board. These switches can be set prior to attaching the board to the host computer. When the board is powered up, the switches are read by the on board microprocessor or controller and the configuration information stored in the appropriate register for use as needed.

In the past, the on board microprocessor or controller received the configuration bits on dedicated lines. Since the microprocessor or controller is typically implemented as an integrated circuit chip, each line requires an additional pin. The number of pins used solely for configuration bits will vary but in some LAN cards is thirty-two. Together with the various control, data and address lines, the total number of pins can exceed one hundred. In general, the cost of a chip increases with an increase in the number of pins. In addition, the cost of the board to which the chip is attached is also more expensive in order to accommodate the extra pins.

OBJECTS OF THE INVENTION

It is therefore an object of the present invention to provide a new and improved circuit board for connecting to a host computer.

It is another object of the present invention to provide an enhancement board having a controller chip with a reduced number of pins.

It is a further object of the present invention to provide a new and improved method for configuring a circuit board connectable to a host computer.

It is yet another object of the present invention to provide an improved architecture for configuring an enhancement board.

SUMMARY OF THE INVENTION

One form of the present invention is a circuit board for connecting to a host computer. The board comprises a controller chip, a parallel bus, a memory for storing a plurality of configuration data bits, and a control line. The controller chip controls the operation of the board and has an internal register for storing a plurality of data bits. The parallel bus transfers data bits between the controller chip and other components on the board and is connected to the memory. The control line is connected between the controller and the memory for enabling the output of the memory to transfer the configuration bits to the internal register over the bus.

Another form of the present invention is a method for configuring a circuit board connectable to a host computer. The circuit board has a controller chip, an internal parallel data bus connected to the chip, and a memory connected to the bus. The method comprises programming the configuration data bits into the memory, providing a control signal to the memory, and transferring the configuration data bits to the controller over the bus.

DESCRIPTION OF A PREFERRED EMBODIMENT

Figure 1A:
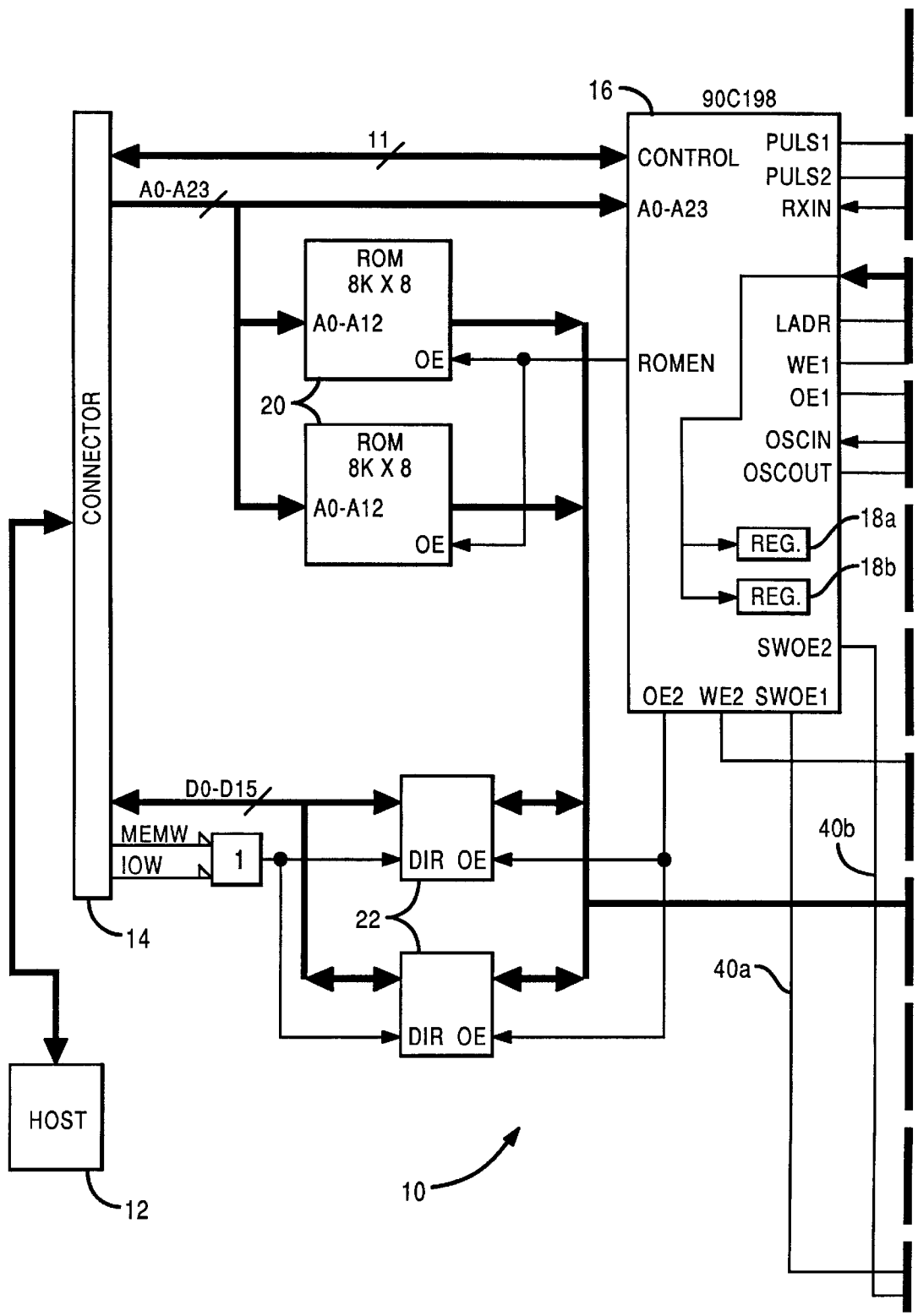
FIGS. 1A and 1B show a block diagram of an expansion circuit board which embodies the present invention.
Figure 1B:
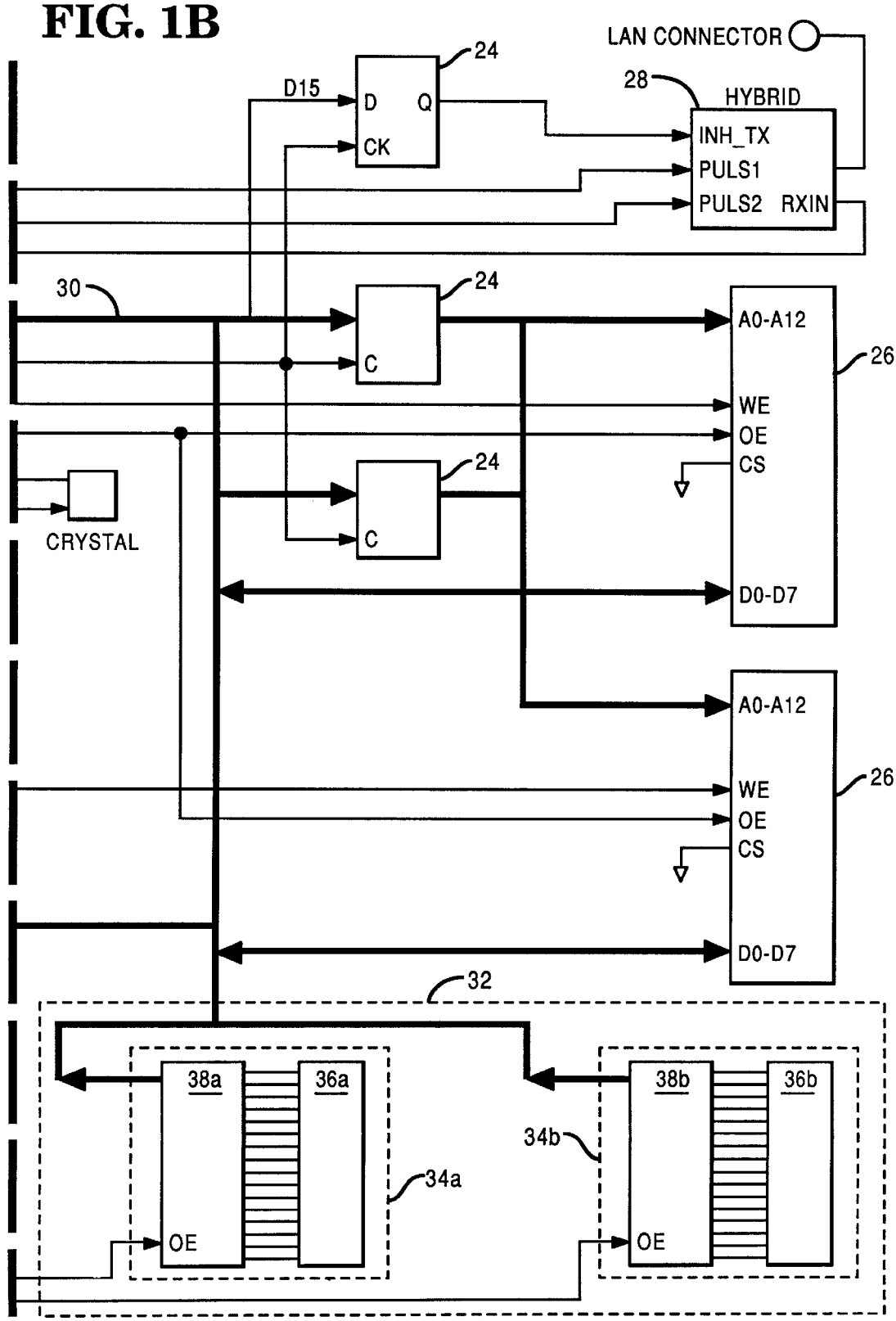

FIGS. 1A and 1B show an expansion or circuit board 10 for connecting to a host computer 12 by means of a connector 14. It will be clear from the following discussion that the architecture and method of the present invention has applicability to a variety of expansion boards. In the embodiment described herein, circuit board 10 is a LAN board, and, more particularly, is a board for interfacing a PC to an ARCNET network. (ARCNET is a type of LAN which employs a token passing system and in which all nodes hear all messages but only respond to those messages addressed to them.)

Circuit board 10 includes a controller 16. In the described embodiment, controller 16 is a 90C198 ARCNET Controller chip available from NCR Microelectronics Products, 2001 Danfield Court, Fort Collins, Colo. 80525. Controller chip 16 controls the operation of board 10. Chip 16 has internal registers 18a and 18b, each capable of storing a plurality of data bits. Other components of board 10 include ROMs 20, transceivers 22, latches 24, RAMs 26, and a transceiver, hybrid 28, connected as shown. Circuit board 10 also includes an internal parallel bus 30 multiplexed for transferring both address and data bits between controller 16 and other components on board 10. For example, each RAM 26 has an address port A0–A12 connected to bus 30 through latches 24, and a data port D0–D7 connected to bus 30.

Circuit board 10 also includes a memory 32 for storing a plurality of configuration control bits as will be explained. Memory 32 is connected to bus 30 and includes memory banks 34a and 34b. Each memory bank 34a and 34b has a plurality of manual switches 36a and 36b, respectively, for programming configuration data into memory 32. Each memory bank 34a and 34b also has a plurality of tri-state buffers 38a and 38b, respectively. Buffers 38a and 38b are connected between switches 36a and 36b, respectively, and bus 30. Other means for programming configuration data bits into memory 32 other than manual switches 36a and 36b are within the scope of the present invention. For example, memory banks 34a and 34b could consist of a programmable array logic (PAL). A PAL will provide a single fixed configuration. This means that the PAL would need to be replaced in order to change the address space.

Control lines 40a and 40b are connected between controller 16 and tri-state buffers 38a and 38b, respectively.

In operation, configuration data bits are programmed into memory banks 34a and 34b by setting the manual switches 36a and 36b, respectively. For example, some of the configuration data bits define the address space occupied by board 10 with respect to host computer 12. The information defining the address space of the memory within board 10 is provided to board 10 by setting a plurality of the switches 36a and/or 36b. Typically, switches 36a and 36b are set prior to board 10 being connected to host computer 12. However, it may be possible to first connect board 10 to host computer 12.

When power is provided to board 10, controller 16 executes a series of microinstructions. These instructions include the serial generation of control signals to memory banks 34a and 34b over control lines 40a and 40b, respectively. When the first control signal over control line 40a is received by tri-state buffer 38a, its output is enabled and the configuration data bits in buffer 38a are transferred in parallel over bus 30 to register 18a within controller 16. Similarly, when the second control signal over control line 40b is received by tri-state buffer 38b, its output is enabled and the configuration data bits in buffer 38b are transferred in parallel over bus 30 to register 18b within controller 16. In this manner, all of the configuration data bits are transferred into controller chip 16 over bus 30. The only pins over and above those required for the normal operation of controller chip 16 are those associated with control lines 40a and 40b. Once the configuration data bits are written into registers 18a and 18b, controller 16 will continue its power up routine utilizing the configuration data bits to configure board 10.

It will be clear to those skilled in the art that the present invention is not limited to the specific embodiment disclosed and illustrated herein. For example, subject to the width of bus 30 and the number of configuration data bits required by board 10, any number of memory banks 34 and corresponding control lines 40 may be employed. In addition, the term "controller", as used herein, is intended to include any microprocessor.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A computer system for configuring an expansion circuit board, comprising;
   a host computer having an expansion slot;
   a connector in the expansion slot being connectable to the host computer;
   an expansion circuit board in the expansion slot connected to said connector such that said connector is located between said expansion circuit board and said host computer, said expansion circuit board including:
   a controller chip for controlling the operation of said expansion circuit board in communication with said host computer, said controller chip including an internal register for storing a plurality of configuration data bits, said configuration data bits permitting said host computer to communicate commands to and receive input from said expansion circuit board, wherein said controller chip is electrically coupled to the host computer when said connector is connected to the host computer, and said controller chip is electrically decoupled from the host computer when said connector is disconnected from the host computer;
   a memory for storing a plurality of configuration data bits which define the address space occupied by said expansion circuit board with respect to said host computer;
   a first parallel bus connected to said controller chip and to said memory and other components on said expansion circuit board for transferring data bits between said controller chip and said memory and said other components;
   a control line connected between said controller chip and said memory for enabling an output of said memory to transfer said configuration data bits to said internal register over said first parallel bus; and
   transceiver means for controlling the transfer of data bits from said expansion circuit board to a second parallel bus extending from said connector to said host computer;
   wherein, when power is supplied to said expansion circuit board, said memory transfers said configuration data bits to said internal register over said first parallel bus independently of a command from said host computer.

2. The computer system of claim 1, wherein said controller chip has a plurality of said internal registers, and said memory is divided into a plurality of memory banks, each of said memory banks storing a plurality of configuration data bits, further comprising:
   a plurality of control lines connected between said controller and respective ones of said memory banks, each such control line enabling an output of each respective memory bank to transfer the configuration data bits therein to a respective register over said first parallel bus.

3. The computer system of claim 1 wherein at least one of said other components on said expansion circuit board has a data port and at least one of said other components has an address port and wherein said first parallel bus is connected to both of said address and data ports.

4. The computer system of claim 1 further comprising means for programming said configuration data bits into said memory.

5. The computer system of claim 4 wherein said programming means includes a plurality of switches which set said configuration data bits.

6. The computer system of claim 1 wherein said memory includes a tri-state buffer connected to said first parallel bus.

7. The computer system of claim 6 wherein said control line is connected between said controller chip and said tri-state buffer.

8. A computer system for configuring an expansion circuit board, comprising:
   a host computer having an expansion slot;
   a connector in the expansion slot being connectable to the host computer;

an expansion circuit board, received in the expansion slot and connected to said connector, such that said connector is located between said expansion circuit board and said host computer, said expansion circuit board including:

a controller chip for controlling the operation of said expansion circuit board in communication with said host computer, said controller chip including a plurality of internal registers for storing a plurality of data bits, said configuration data bits permitting said host computer to communicate commands to and receive input from said expansion circuit board, wherein said controller chip is electrically coupled to the host computer when said connector is connected to the host computer, and said controller chip is electrically decoupled from the host computer when said connector is disconnected from the host computer;

a memory having a plurality of memory banks corresponding to said plurality of registers;

a first parallel bus connected to said controller chip and to said memory and other components on said expansion circuit board for transferring data bits between said controller chip and said memory and said other components, wherein the total bit capacity of said memory banks is more than the bit capacity of said first parallel bus;

means for programming a plurality of configuration data bits which define the address space occupied by said expansion circuit board with respect to said host computer, said means being connected to said memory banks; and a plurality of control lines corresponding to said plurality of registers connected between said controller chip and respective ones of said memory banks, said plurality of control lines including a first control line extending from the controller chip to a first memory bank in the plurality of memory banks and a second control line extending from the controller chip to a second memory bank in the plurality of memory banks, wherein said first control line is separate and distinct from said second control line such that when a first control signal is provided to the first memory bank along the first control line the first control signal is not provided to the second memory bank and when a second control signal is provided to the second memory bank along the second control line the second control signal is not provided to the first memory bank, wherein the first and second control signals are generated by the controller chip when power is supplied to said expansion circuit board;

wherein, in response to the first control signal to said first memory bank and to the second control signal to said second memory bank, said memory transfers said configuration data bits in each of the first and second memory banks to said plurality of internal registers over said first parallel bus independently of a command from said host computer and wherein said first control signal is communicated at a first time period to the first memory bank along the first control line and said second control signal is communicated at a second time period to the second memory bank along the second control line, the first and second time periods being different, for enabling the transfer at different times of the configuration data bits contained in each of the first and second memory banks to a respective register over said first parallel bus.

9. The computer system of claim 8 wherein the first memory bank transfers said configuration data bits in the first memory bank solely in response to the first control signal and the second memory bank transfers said configuration data bits in the second memory bank solely in response to the second control signal.

10. The computer system of claim 9 wherein each memory bank further includes a tri-state buffer connected to said first parallel bus, and wherein the corresponding control line is connected between said controller chip and said tri-state buffer.

11. The computer system of claim 10 wherein at least one of said other components has a data port and at least one of said other components has an address port and wherein said first parallel bus is connected to both of said address and data ports.

12. A method for configuring an expansion circuit board received within an expansion slot having a connector, a controller chip connected to the connector, an internal parallel bus connected to said controller chip, a plurality of memory banks connected to said internal parallel bus for containing a plurality of configuration data bits, and a plurality of control lines extending from said memory banks to said controller chip, comprising the steps of:

programming configuration data bits which define the address space occupied by said expansion circuit board with respect to a host computer into said memory banks;

connecting said connector to said host computer, said controller chip being electrically coupled to said host computer when said connector is connected to the host computer, and said controller chip being electrically decoupled from the host computer when said connector is disconnected from the host computer;

first providing a first control signal on a first control line to a first of said memory banks wherein the first control line extends from the controller chip to the first memory bank;

transferring, in response to said first control signal, the configuration data bits in said first memory bank to said controller chip over said internal parallel bus;

second providing, after said first providing step, a second control signal on a second control line to a second of said memory banks, wherein the second control line extends from the controller chip to the second memory bank; and transferring, in response to said second control signal, the configuration data bits in said second memory bank to said controller chip over said internal parallel bus, wherein said first control line is separate and distinct from said second control line such that when the first control signal is provided to the first memory bank along the first control line the first control signal is not provided to the second memory bank and when the second control signal is provided to the second memory bank along the second control line the second control signal is not provided to the first memory bank and said transferring steps are performed in response to the application of power to said expansion circuit board and independently of a command of said host computer.

13. The method of claim 12 further comprising:

repeating said last two steps for succeeding memory banks until all of said configuration data bits have been transferred to said controller.

14. The method of claim 15 wherein said memory banks include a plurality of manual switches and wherein said programming step includes:

setting said switches to define said configuration bits.

15. The computer system of claim 1, wherein said controller chip comprises ROM containing commands for transferring said configuration data bits to the internal register and interface and decoding logic for processing said commands from said host computer.

16. The computer system of claim 1, wherein said memory transfers said configuration data bits directly to said internal register over said first parallel bus without said configuration data bits passing through said connector.

17. The computer system of claim 8, wherein each of said plurality of memory banks corresponds to a different one of said plurality of internal registers and each of said plurality of memory banks is connected to an internal register in response to a separate one of said plurality of control lines.

* * * * *